US010963896B2

(12) United States Patent
Nishikawa

(10) Patent No.: US 10,963,896 B2
(45) Date of Patent: Mar. 30, 2021

(54) SALES DATA PROCESSING APPARATUS, SERVER AND METHOD FOR ACQUIRING ATTRIBUTE INFORMATION

(71) Applicant: TOSHIBA TEC KABUSHIKI KAISHA, Tokyo (JP)

(72) Inventor: Hiroshi Nishikawa, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/459,703

(22) Filed: Jul. 2, 2019

(65) Prior Publication Data
US 2019/0325461 A1    Oct. 24, 2019

Related U.S. Application Data

(63) Continuation of application No. 15/098,581, filed on Apr. 14, 2016, now abandoned.

(51) Int. Cl.
*G06Q 10/00* (2012.01)
*G06Q 30/02* (2012.01)
(Continued)

(52) U.S. Cl.
CPC ..... *G06Q 30/0201* (2013.01); *G06K 9/00248* (2013.01); *G06K 9/00771* (2013.01); *H04N 7/181* (2013.01)

(58) Field of Classification Search
CPC ...................................................... G06Q 30/02
See application file for complete search history.

(56) References Cited

U.S. PATENT DOCUMENTS 5,770,848 A * 6/1998 Oizumi .............. G06K 7/10831
235/383
6,311,173 B1 * 10/2001 Levin ...................... G06F 17/18
706/21
(Continued)

FOREIGN PATENT DOCUMENTS

JP    2002-032553    1/2002
JP    2003-099582    4/2003
(Continued)

OTHER PUBLICATIONS https://www.ftc.gov/sites/default/files/documents/reports/facing-facts-best-practices-common-uses-facial-recognition-technologies/121022facialtechrpt.pdf (Year: 2012).*
(Continued)

*Primary Examiner* — Joseph M Waesco
*Assistant Examiner* — Jay-Ming Wang
(74) *Attorney, Agent, or Firm* — Amin, Turocy & Watson, LLP

(57) ABSTRACT

A sales data processing apparatus configured to: store commodity information of a commodity to which a transaction processing is executed in a storage section; store, if a face from which attribute of a customer who purchases the commodity can be determined is detected from images captured by a camera, attribute information indicating the attribute determined according to face image information of the detected face in the storage section in association with the commodity information; send the stored commodity information to a server if the face from which the attribute of the customer who purchases the commodity can be determined is not detected according to the captured images; and store the attribute information indicating the attribute which is determined according to the face image information of a customer sent from the server which extracts the customer according to the sent commodity information in
(Continued)

the storage section in association with the commodity information.

3 Claims, 12 Drawing Sheets

(51) Int. Cl.
*G06K 9/00* (2006.01)
*H04N 7/18* (2006.01)

(56) References Cited

U.S. PATENT DOCUMENTS

| | | | |
|---|---|---|---|
| 8,989,454 B2 | 3/2015 | Kamiya | |
| 9,092,795 B2 * | 7/2015 | Inagawa | G06Q 30/02 |
| 9,483,798 B2 | 11/2016 | Kamiya | |
| 10,079,998 B2 * | 9/2018 | Nakase | H04N 7/18 |
| 2005/0198661 A1 | 9/2005 | Collins et al. | |
| 2010/0128048 A1 | 5/2010 | Makino et al. | |
| 2012/0259701 A1 * | 10/2012 | Kumazawa | G06Q 30/0601 |
| | | | 705/14.53 |
| 2013/0196591 A1 * | 8/2013 | Ikeda | H04N 21/43615 |
| | | | 455/11.1 |
| 2013/0251216 A1 * | 9/2013 | Smowton | G06K 9/6807 |
| | | | 382/118 |
| 2013/0256404 A1 * | 10/2013 | Nishihashi | G06Q 30/06 |
| | | | 235/375 |
| 2013/0328765 A1 * | 12/2013 | Kawamoto | G06Q 30/0255 |
| | | | 345/156 |
| 2014/0153786 A1 | 6/2014 | Takeno et al. | |
| 2014/0214484 A1 | 7/2014 | Hirakawa et al. | |
| 2016/0260178 A1 * | 9/2016 | Mochizuki | G06F 16/2291 |
| 2016/0292662 A1 * | 10/2016 | Kobayashi | G03B 17/53 |
| 2016/0300247 A1 * | 10/2016 | Nishikawa | G06Q 30/0201 |
| 2019/0287182 A1 * | 9/2019 | Chetal | G06Q 10/06398 |

FOREIGN PATENT DOCUMENTS

| | | |
|---|---|---|
| JP | 2010-033143 | 2/2010 |
| JP | 2010-055248 | 3/2010 |
| JP | 2013-003866 | 1/2013 |
| JP | 2013-003872 | 1/2013 |
| JP | 2014-146154 | 8/2014 |

OTHER PUBLICATIONS

Japanese Decision to Grant a Patent for Japanese Patent Application No. 2015-066705 dated Aug. 1, 2017.
U.S. Office Action dated Oct. 3, 2018 corresponding to U.S. Appl. No. 15/098,581, filed Apr. 14, 2016.
U.S. Office Action dated Apr. 4, 2019 corresponding to U.S. Appl. No. 15/098,581, filed Apr. 14, 2016.

* cited by examiner

FIG.4

| AGE BRACKET | FACE PARTS INFORMATION SECTION |
|---|---|
| TEENS (MAN) | |
| TEENS (WOMAN) | |
| TWENTIES (MAN) | |
| TWENTIES (WOMAN) | |
| THIRTIES (MAN) | |
| THIRTIES (WOMAN) | |
| FORTIES (MAN) | |
| FORTIES (WOMAN) | |
| FIFTIES (MAN) | |
| FIFTIES (WOMAN) | |
| SIXTIES (MAN) | |
| SIXTIES (WOMAN) | |
| OVER 70 YEARS OLD (MAN) | |
| OVER 70 YEARS OLD (WOMAN) | |

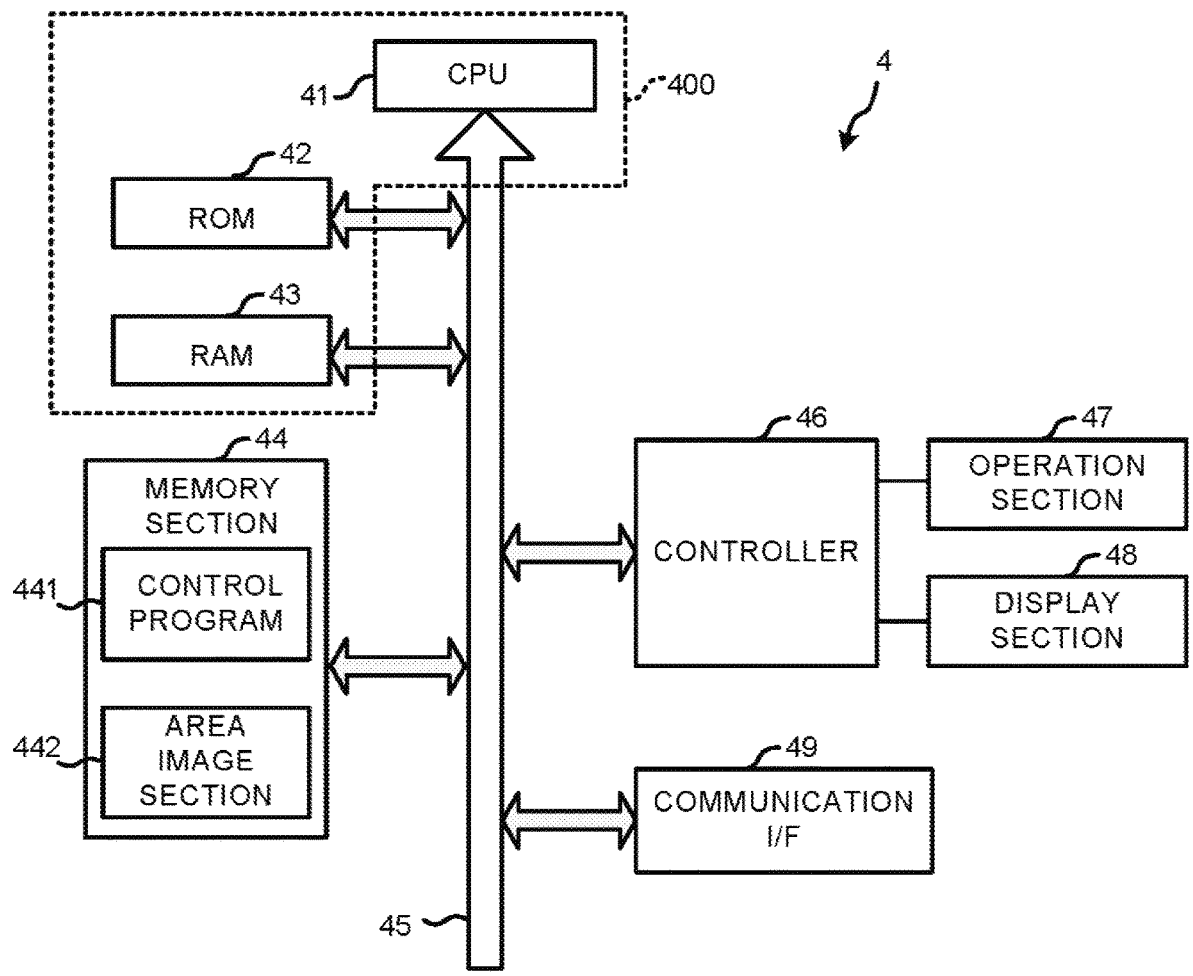
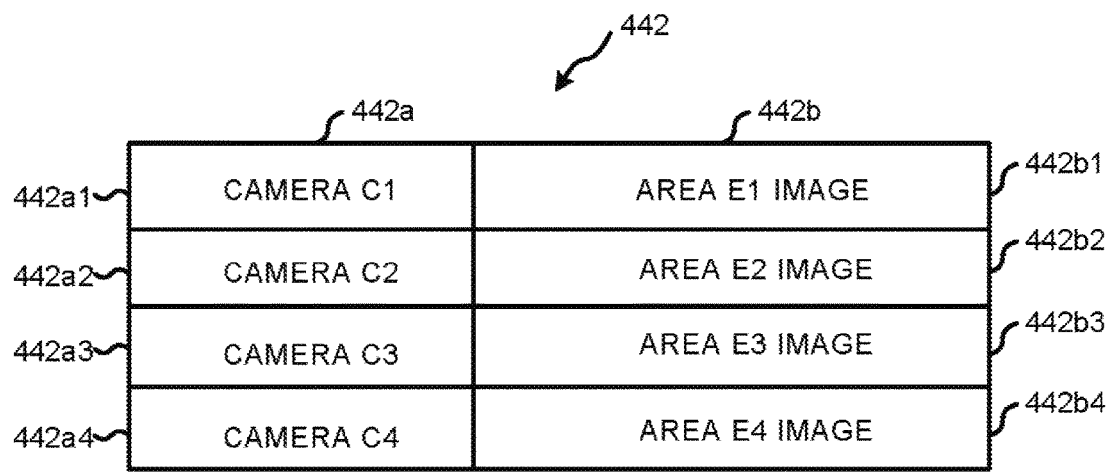

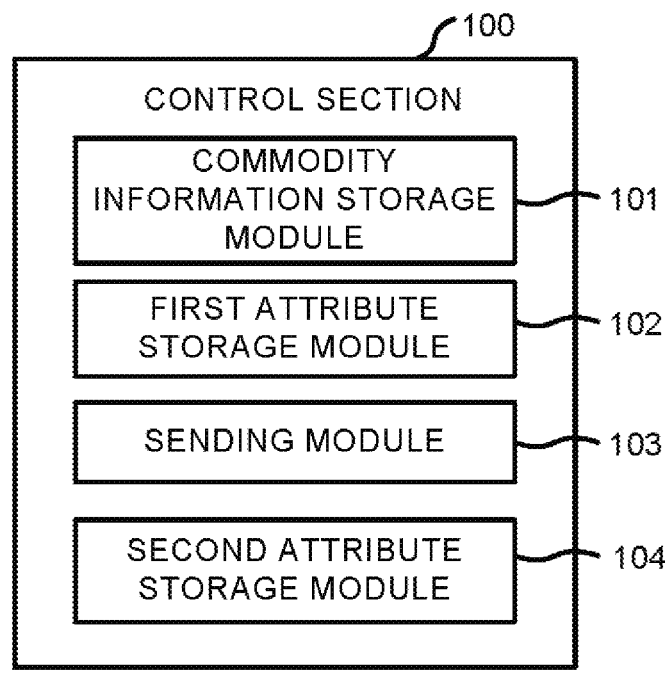

SALES DATA PROCESSING APPARATUS, SERVER AND METHOD FOR ACQUIRING ATTRIBUTE INFORMATION

CROSS-REFERENCE TO RELATED APPLICATIONS

This application is a Continuation of application Ser. No. 15/098,581 filed on Apr. 14, 2016, the entire contents of which are incorporated herein by reference.

FIELD

Embodiments described herein relate generally to a sales data processing apparatus, a server and a method for acquiring attribute information.

BACKGROUND

In a retail store such as a convenience store, there is a case in which attribute information such as a gender, age bracket and the like of a customer who purchases commodities in the store is acquired to analyze customer layers and the sales of commodities. The attribute information of the customer is acquired by analyzing the image of the customer captured by a camera arranged on a POS terminal (Point of Sales) or a ceiling.

To acquire the attribute information from the image of the customer, it is needed to photograph the face of the customer from the front of the customer. However, it is difficult to detect the face of a customer in a case in which the customer is not directly facing the camera or in a case in which the customer is directly facing the camera but wears a mask or hat, thus, the attribute information of the customer may not be acquired.

DESCRIPTION OF THE DRAWINGS

FIG. 4 is a memory map exemplifying a face master file of the POS terminal;

FIG. 5 is a block diagram illustrating the hardware structure of a camera server;

FIG. 6 is a memory map exemplifying an area storage section of the camera server;

FIG. 7 is a functional block diagram illustrating the functional structure of the POS terminal;

DETAILED DESCRIPTION

Figure 1:
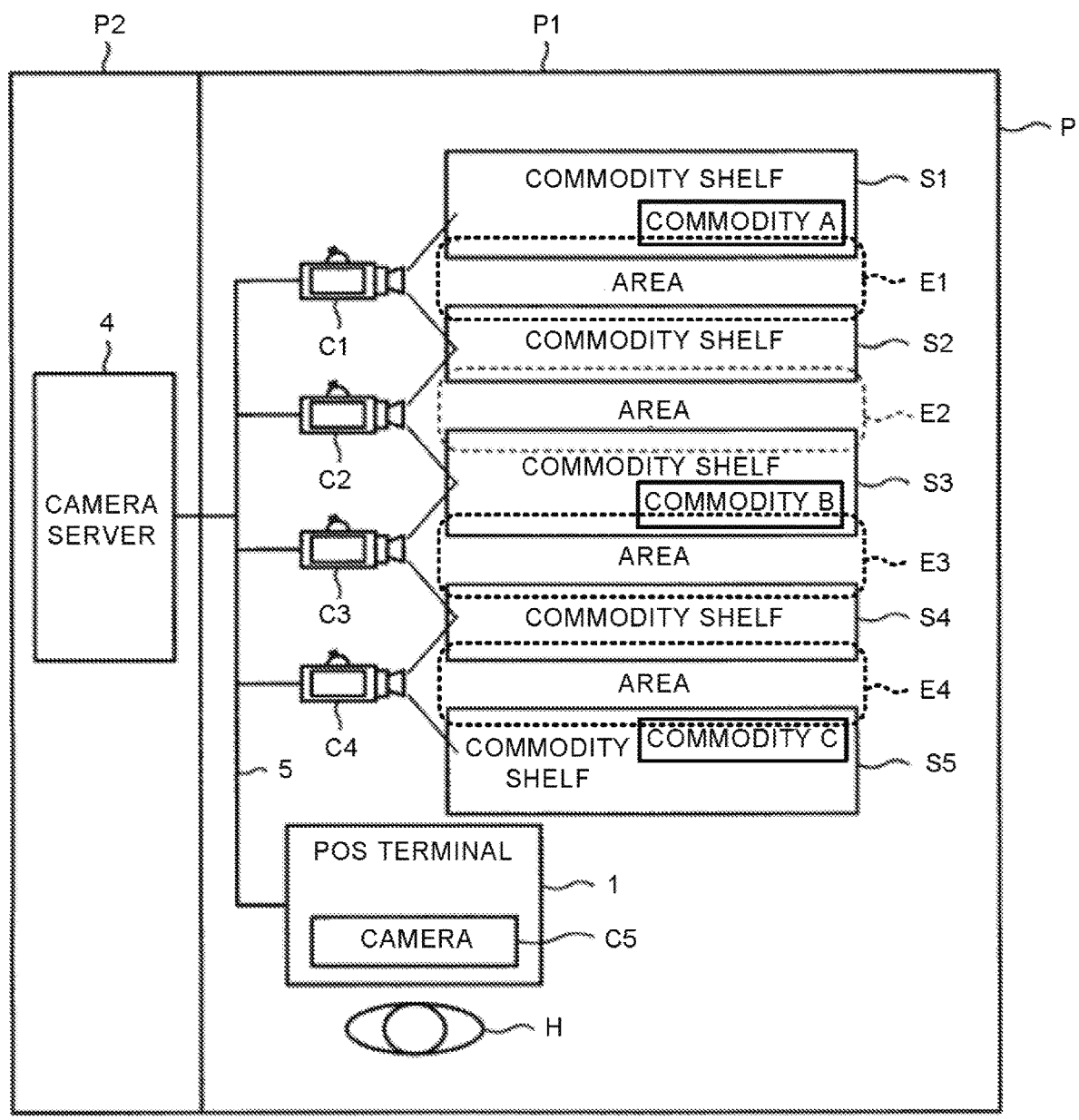
FIG. 1 is a plan view schematically illustrating the arrangement of each apparatus in a store.

In accordance with an embodiment, a sales data processing apparatus containing a hardware processor configured to: store commodity information of a commodity to which a transaction processing is executed in a storage section; store, if a face from which attribute of a customer who purchases the commodity can be determined is detected from images captured by a camera, attribute information indicating the attribute determined according to face image information of the detected face in the storage section in association with the commodity information; send the stored commodity information to a server if the face from which the attribute of the customer who purchases the commodity can be determined is not detected according to the captured images; and store the attribute information indicating the attribute which is determined according to the face image information of a customer sent from the server which extracts the customer according to the sent commodity information in the storage section in association with the commodity information, wherein if the number of commodities indicated with the stored commodity information is equal to or more than three, the stored commodity information and an inquiry signal inquiring about the face image are sent to the server, and if the number of the commodities indicated with the stored commodity information is less than three, the stored commodity information and the inquiry signal are not sent to the server.

a sales data processing apparatus comprises a commodity information storage module configured to store commodity information of a commodity to which a transaction processing is executed in a storage section; a first attribute storage module configured to store, if a face from which an attribute of a customer who purchases the commodity can be determined is detected from images captured by a camera, attribute information indicating the attribute determined according to face image information of the detected face in the storage section in association with the commodity information; a sending module configured to send the commodity information stored by the commodity information storage module to a server if the face from which the attribute of the customer who purchases the commodity can be determined is not detected according to the captured images; and a second attribute storage module configured to store the attribute information indicating the attribute which is determined according to the face image information of a customer sent from the server which extracts the customer according to the sent commodity information in the storage section in association with the commodity information.

The sales data processing apparatus, the server and the method for acquiring attribute information according to the embodiment are described below in detail with reference to FIG. 1-FIG. 13. In the embodiment, a POS terminal is used as the sales data processing apparatus. Further, a camera server is used as a server to describe the embodiment. The embodiment described below is not to be construed as limiting the present invention.

FIG. 1 is a plan view schematically illustrating a state in which a POS terminal 1 and a camera server 4 are arranged in a store according to the embodiment. In FIG. 1, there are a sales area P1 where commodities are displayed to be sold and an office area P2 serving as a back office in the store P. A plurality of rows of shelves S (S1-S5), a plurality of cameras C (C1-C5) and a POS terminal 1 are arranged in the sales area P1. A reference character 'S' is used to represent the shelves collectively while reference characters 'S1-S5' are used to represent the shelves separately. A reference character 'C' is used to represent the cameras collectively while reference characters 'C1-C5' are used to represent the cameras separately. The camera server 4 is installed in the office area P2.

The POS terminal 1, the cameras C1-C4 and the camera server 4 are electrically connected with one another via a communication line 5. The camera C5 is built in the POS terminal 1.

Each shelf S is segmented into a plurality of sections in each of which a plurality of commodities is displayed. An area E (E1-E4) is separately arranged between the shelves S. A reference character 'E' is used to represent the areas collectively while reference characters 'E1-E4' are used to represent the areas separately. The area E is arranged between the shelves S enough for the customer to pass through. The customer can view the commodities displayed on the shelf S or pick up a commodity from the shelf and place the commodity into a shopping basket to purchase it while passing through the area E.

The cameras C1-C4 are installed on the ceiling of the sales area P1 of the store P. The cameras C1-C4 arranged on the ceiling are oriented towards the areas E respectively. The cameras C1-C4 each consisting of, for example, a CCD, capture continuous still pictures or moving pictures (referred to as 'images' collectively) of a photographed object such as a customer H. In the embodiment, the cameras C1-C4 capture 10 continuous still images of the customer H who respectively passes through the areas E within one second. The camera C1 captures images of a customer who passes through the area E1. The camera C2 captures images of a customer who passes through the area E2. The camera C3 captures images of a customer who passes through the area E3. The camera C4 captures images of a customer who passes through the area E4. The images captured by the cameras C1-C4 are sent to the camera server 4 via the communication line 5.

The POS terminal 1 carries out a sales registration processing relating to commodities sold in the store. An operator CH (store clerk) operates the POS terminal 1 to carry out a sales registration processing and a settlement processing for sold commodities through the POS terminal 1. The sales registration processing refers to a processing of optically reading a code symbol, for example, a barcode, attached to a commodity, inputting a commodity code and displaying the commodity name and the price (commodity information) of the commodity read according to the input commodity code while storing the commodity information in a buffer. The settlement processing refers to a processing of displaying a total amount relating to the transaction according to the commodity information stored in the buffer along with the execution of the sales registration processing and calculating a change amount according to a deposit amount paid by a customer and displaying the calculated change amount, a processing of instructing a change dispensing machine to issue change and a processing of issuing a receipt on which the commodity information and settlement information (the total amount, the deposit amount and the change amount) is printed. Further, the combination of the sales registration processing and the settlement processing is referred to as a transaction processing.

The camera C5 is arranged on a display section for customer (refer to FIG. 2) of the POS terminal 1 facing a customer who purchases a commodity. The camera C5 captures images of a customer H who purchases a commodity. In the embodiment, the camera C5 captures, for example, 10 continuous still images of the customer H within one second.

Figure 2:
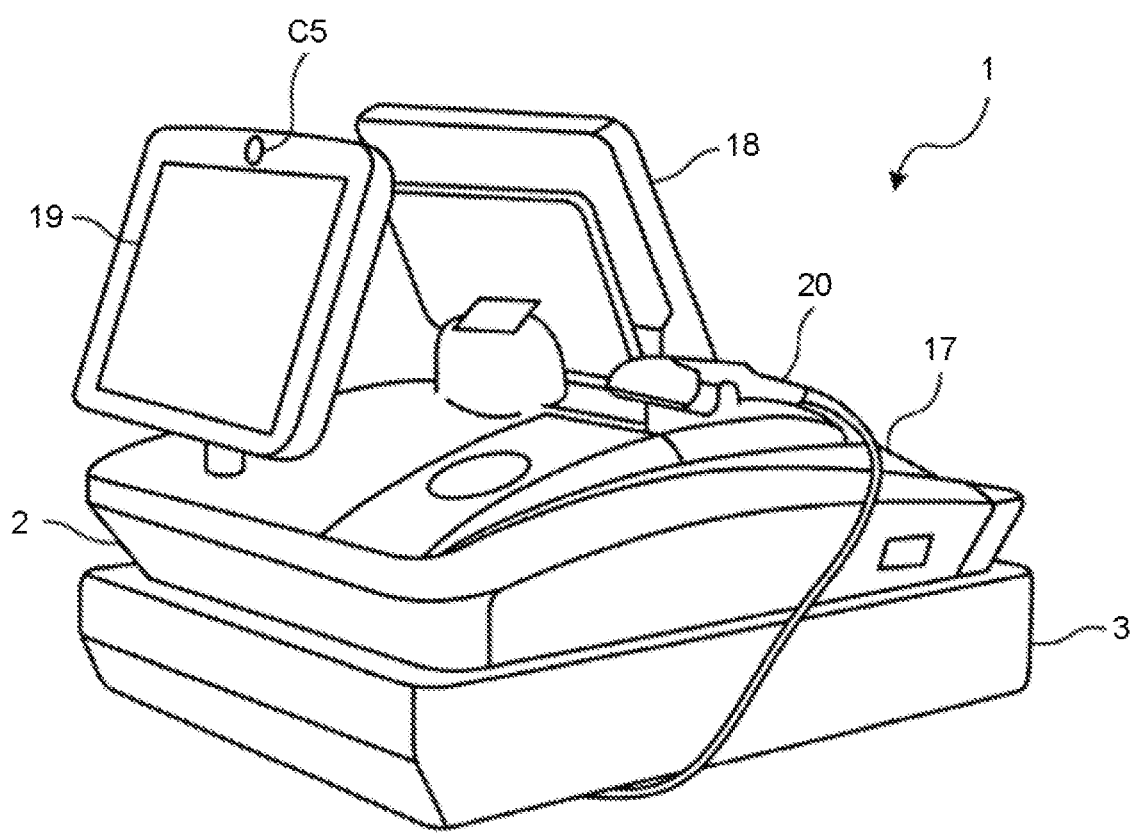
FIG. 2 is a perspective view illustrating the appearance of a POS terminal at a customer side according to an embodiment.

FIG. 2 is a perspective view illustrating the appearance of the POS terminal 1 at the side of a customer H according to the embodiment. In FIG. 2, the POS terminal 1 includes a main body 2 and a cash box 3. The cash box 3 with a drawer stores cash such as bills and coins and marketable securities such as a gift voucher received from a customer H and change to be dispensed to the customer H.

An operation section 17 (e.g. a keyboard) for inputting information, a display section 18 for store clerk, e.g., a liquid crystal display, which displays information to the operator and a display section 19 for customer, e.g., a liquid crystal display, which displays information to the customer H are arranged on the main body 2. Further, the main body 2 is provided with a reading section 20 for reading a code symbol, for example, a barcode or a two-dimensional code, attached to a commodity. The reading section 20 reads and inputs a barcode or a two-dimensional code, attached to a commodity with the use of a CCD line sensor. Further, a control section (refer to FIG. 3) of the POS terminal land a printing section 21 for printing commodity information and issuing a receipt are arranged in the main body 2.

Further, the camera C5 consisting of, for example, a CCD image sensor is arranged at a side above the display surface of the display section 19 for customer of the POS terminal 1. The camera C5 captures the image of a customer H substantially directly facing towards the POS terminal 1 by photographing the face of the customer H as the center.

Figure 3:
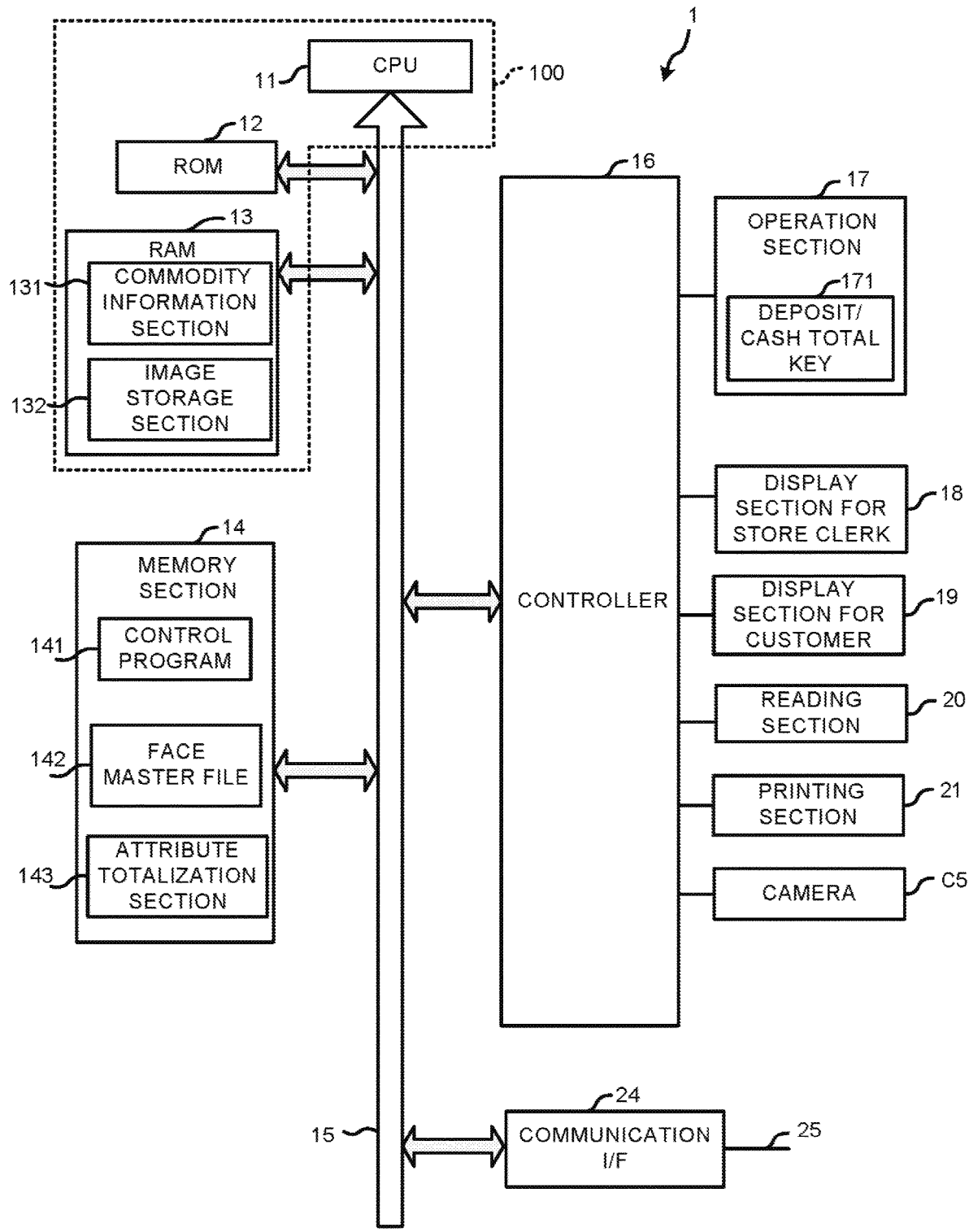
FIG. 3 is a block diagram illustrating the hardware structure of the POS terminal.

Next, the hardware of the POS terminal 1 is described below with reference to FIG. 3 and FIG. 4. FIG. 3 is a block diagram illustrating the hardware structure of the POS terminal 1. As shown in FIG. 3, the POS terminal 1 comprises a CPU (Central Processing Unit) 11, a ROM (Read Only Memory) 12, a RAM (Random Access Memory) 13 and a memory section 14. The CPU 11 acts as a main part of control. The ROM 12 stores various programs. The RAM 13 copies or decompresses programs and various data. The memory section 14 stores various programs. The CPU 11, the ROM 12, the RAM 13 and the memory section 14 are connected with each other via a data bus line 15. The CPU 11, the ROM 12 and the RAM 13 constitute a control section 100. The control section 100 carries out a control processing described later in such a manner that the CPU 11 operates according to a control program 141, stored in the ROM 12 or the memory section 14, which is copied or decompressed on the RAM 13.

The RAM 13 includes a commodity information section 131 and an image storage section 132. The commodity information section 131 stores the commodity information (the name, the price, etc.) of a commodity, corresponding to a commodity code read by the reading section 20, to which a sales registration processing is carried out. The image storage section 132 stores the image of a customer H whose face is detected from an image captured by the camera C5. The face of a person is detected with the use of a well-known face detection technology with which a human face is determined by detecting each part (eyes, nose, mouth, ears and jaw) of a face from an image captured by the camera C5.

The memory section 14, which consists of a nonvolatile memory such as an HDD (Hard Disc Drive) or a flash memory capable of holding stored information even if power is cut off, stores programs including the control program 141. Further, the memory section 14 includes a face master file 142 (refer to FIG. 4) and an attribute totalization section 143.

The attribute totalization section 143 totalizes, by attributes (e.g. gender and age bracket), the commodity information of a commodity (commodity purchased by a customer) to which the sales registration processing is carried out by the POS terminal 1 in association with the attribute information of a customer who purchases the commodity and stores them. The tendency or the propensity of customers to purchase commodities can be analyzed, by attribute, according to the commodity information stored in the attribute totalization section 143.

Further, the operation section 17, the display section 18 for store clerk, the display section 19 for customer, the reading section 20, the printing section 21 and the camera C5 are connected with the data bus line 15 via a controller 16. The controller 16 controls the operation section 17, the display section 18 for store clerk, the display section 19 for customer, the reading section 20, the printing section 21 and the camera C5 according to instructions received from the control section 100. For the convenience of description, the control carried out by the controller 16 is described as being carried out by the control section 100.

The operation section 17 includes various keys including numeric keys and function keys. A 'subtotal' key is operated to declare the start of a settlement processing. If the 'subtotal' key is operated, the sales registration processing of the purchased commodities is ended and then the settlement processing of the transaction is started. A 'deposit/cash total' key 171 is operated to declare the end of the transaction. If the 'deposit/cash total' key 171 is operated, the settlement processing with cash is executed.

The display section 18 for store clerk, the display surface of which faces towards the operator (store clerk), displays information for the operator. The display section 19 for customer, the display surface of which faces towards a customer H, displays information for the customer H. Further, touch keys (not shown), respectively arranged on the display section 18 for store clerk and the display section 19 for customer, which are touched to function as a key, constitute a part of the operation section 17.

The reading section 20 consisting of a CCD image sensor inputs a commodity code by reading a code symbol, for example, a barcode or a two-dimensional code, attached to a commodity with the CCD image sensor. In the embodiment, a store clerk closes or contacts the hand-held reading section 20 to or with the code symbol attached to a commodity to read the code symbol. The reading section 20 may be a scanner which emits light to scan the code symbol with a polygonal mirror and the like and receives the light reflected from the code symbol.

The printing section 21 includes, for example, a thermal printer provided with a thermal transfer type print head. The printing section 21 takes out a rolled receipt paper housed in the main body 2 and prints commodity information and settlement information on the receipt paper to issue the printed paper as a receipt. The camera C5 made up of a CCD or the like captures images of a photographed object such as a customer H. In the embodiment, the camera C5 continuously captures, for example, 10 images of a customer H within one second.

Further, the camera server 4 and a store server (not shown) arranged in the office area P2 in the store are connected with a communication I/F (Interface) through the data bus line 15. The communication I/F 24 is connected with the communication line 5. The store server is electronically connected with each POS terminal 1 arranged in the store to collect commodity information and settlement information from each POS terminal 1. The store server sends the commodity information and settlement information collected from each POS terminal 1 to a headquarters server (not shown) arranged in the headquarters.

FIG. 4 is a memory map illustrating the face master file 142 of the memory section 14. In FIG. 4, the face master file 142 has face parts information sections 1421 in which face parts information of people grouped by age bracket (from teens to over 70 years old) and gender is stored. Face parts information according to which an attribute (age bracket and gender) can be determined is stored in each of the face parts information sections 1421.

The face parts information refers to data, obtained by classifying a face of a person in accordance with parts and features, which indicates each part and feature of each attribute, for example, data representing features of parts containing the eyes, the nose, the mouth, the ears and the jaw of a person and modified features of a face containing a smiling face, a straight face, a face with closed eyes and a face with opened eyes. The face parts information stored by each attribute represents the features of the attribute different from those of the other attributes. For example, in the face parts information section 1421 for boys in their teens, there is stored information containing distinctive eyes, noses, mouths and ears indicating the features of boys in their teens and information containing distinctive smiling faces and distinctive straight faces indicating the features of boys in their teens. The face parts information stored by the attribute represents the attribute markedly, which is created according to a plurality of statistical data.

Next, the hardware of the camera server 4 is described with reference to FIG. 5. In FIG. 5, the camera server 4 comprises a CPU 41 acting as a main part of control, a ROM 42 for storing various programs, a RAM 43 for copying or decompressing various data and a memory section 44 for storing various programs. The CPU 41, the ROM 42, the RAM 43 and the memory section 44 are connected with each other via a data bus line 45. The CPU 41, the ROM 42 and the RAM 43 constitute a control section 400. The control section 400 carries out a control processing (refer to FIG. 11 and FIG. 12) described later in such a manner that the CPU 41 operates according to a control program 441, stored in the ROM 42 and the memory section 44, which is copied or decompressed on the RAM 43.

The memory section 14, which consists of a nonvolatile memory such as an HDD (Hard Disc Drive) or a flash memory capable of holding stored information even if power is cut off, stores programs including the control program 441. Further, the memory section 44 includes an area image section 442 (refer to FIG. 6).

Further, an operation section 47 and a display section 48 are connected with a controller 46 through the data bus line 45. The operation section 47 is a keyboard equipped with keys for various operations. The display section 48 is, for example, a liquid crystal display device for displaying information. Further, a communication I/F (Interface) 49 is connected to the data bus line 45. The communication I/F 49 is electrically connected with the POS terminal 1 and the cameras C1-C4 via the communication line 5.

Next, the area image section 442 stored in the storage section 44 is described with reference to FIG. 6. The area image section 442 stores the images of the areas E respectively captured by the cameras C1-C4. The area image section 442 includes a camera section 442a that stores a camera code for specifying a camera C which captures an image and an area image section 442b that stores image information of images captured by each camera C. The camera code of the camera C1 is stored in a camera section 442a1, and the images captured by the camera C1 are stored in an area E1 image section 442b1. The camera code of the camera C2 is stored in a camera section 442a2, and the images captured by the camera C2 are stored in an area E2 image section 442b2. The camera code of the camera C3 is stored in a camera section 442a3, and the images captured by the camera C3 are stored in an area E3 image section 442*b*3. The camera code of the camera C4 is stored in a camera section 442*a*4, and the images captured by the camera C4 are stored in an area E4 image section 442*b*4.

Further, in the embodiment, the images captured by the camera C for the last two hours are stored in the area image section 442*b* and then those captured before two hours are successively deleted. Statistically, as most customers finish their shopping within two hours, the storage of the images captured by the camera C for the last two hours in the area image section 442*b* is enough.

Sequentially, the control processing carried out by the POS terminal 1 is described with reference to FIG. 7-FIG. 10. FIG. 7 is a functional block diagram illustrating the functional structure of the POS terminal 1. The control section 100 realizes functions of a commodity information storage module 101, a first attribute storage module 102, a sending module 103 and a second attribute storage module 104 according to various programs including the control program 141 stored in the ROM 12 and the storage section 14.

The commodity information storage module 101 has a function of storing commodity information of a commodity to which a transaction processing is executed in the storage section.

The first attribute storage module 102 has a function of storing, if a face from which the attribute of a customer who purchases a commodity can be determined can be detected from images captured by a camera, attribute information indicating the attribute determined according to the face image information of the detected face in the storage section in association with the commodity information.

The sending module 103 has a function of sending the commodity information stored by the commodity information storage module 101 to the server if a face from which the attribute of a customer who purchases a commodity can be determined cannot be detected from the images captured by a camera.

The second attribute storage module 104 has a function of storing the attribute information, sent from the server that extracts a customer according to the commodity information sent through the sending module 103, which indicates an attribute determined according to the face image information of the customer in the storage section in association with the commodity information.

Figure 8:
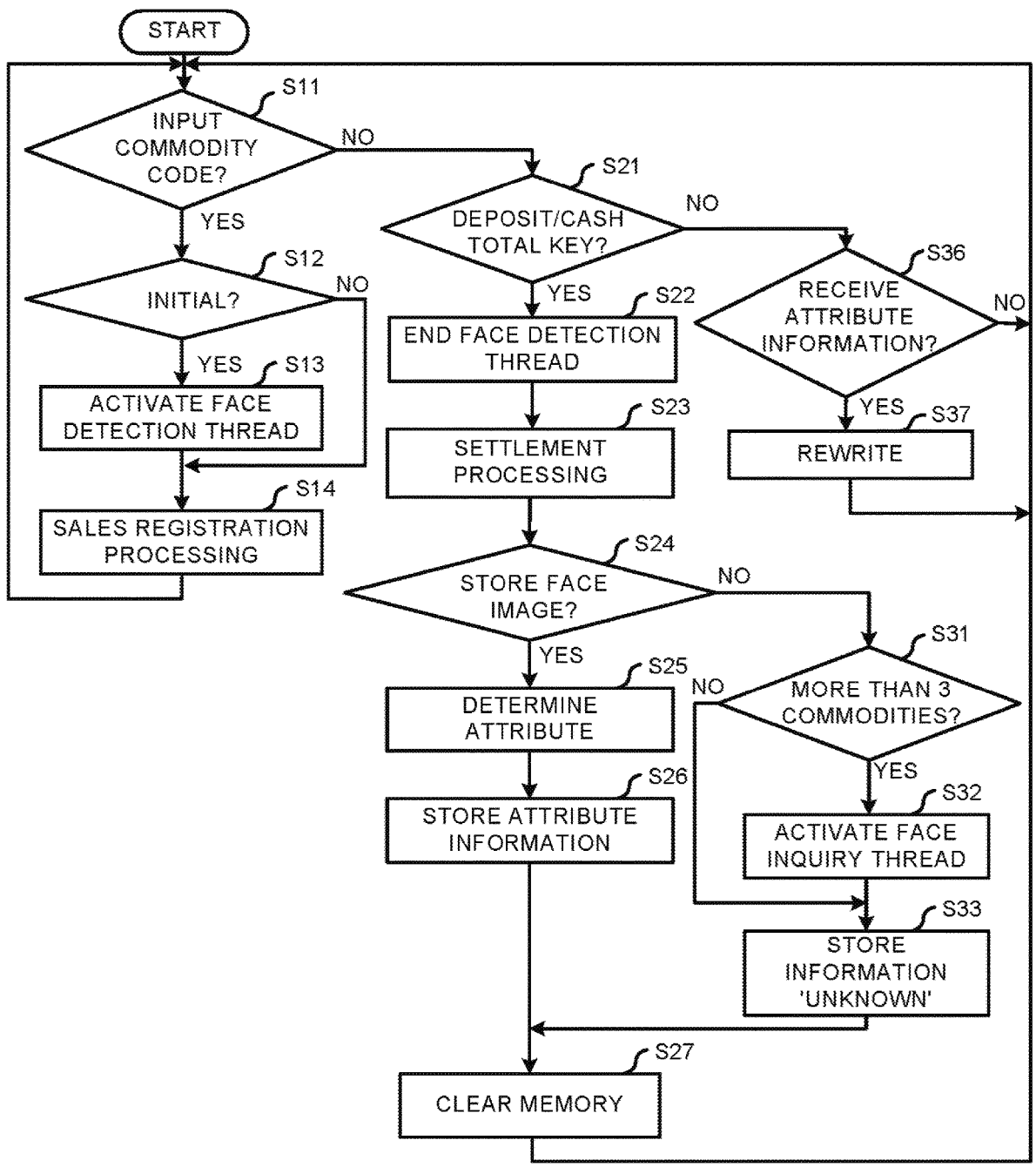
FIG. 8 is a flowchart illustrating the flow of a control processing carried out by the POS terminal.
Figure 9:
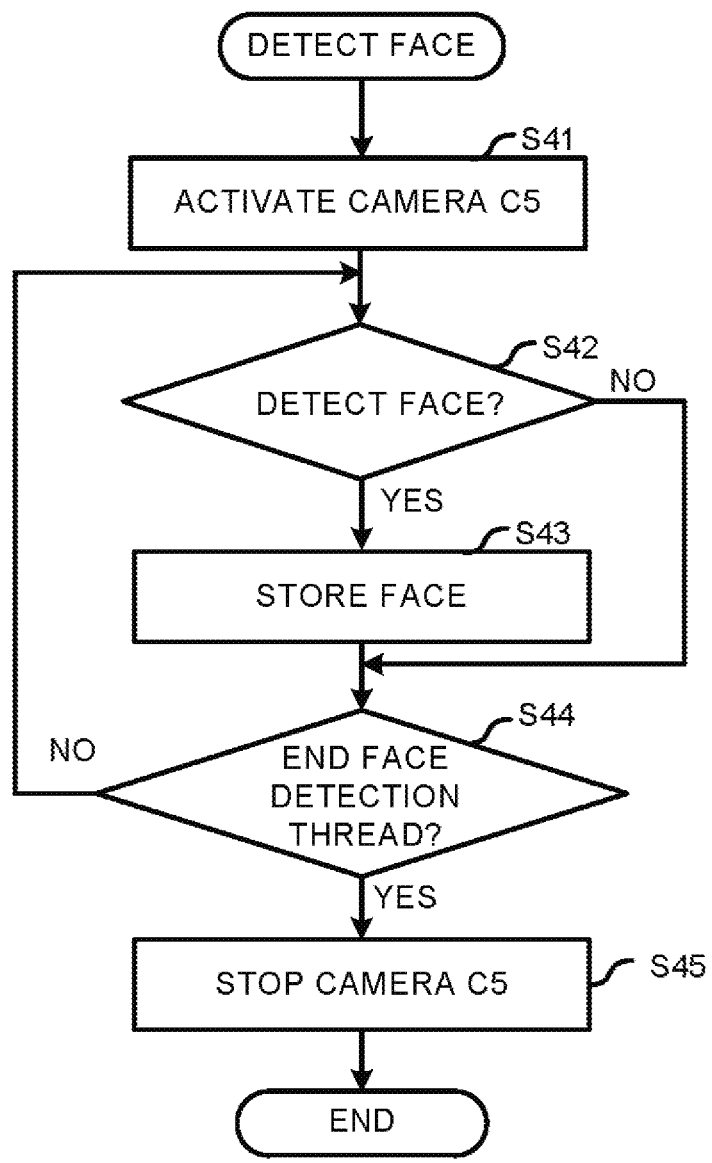
FIG. 9 is a flowchart illustrating the flow of a control processing carried out by the POS terminal.
Figure 10:
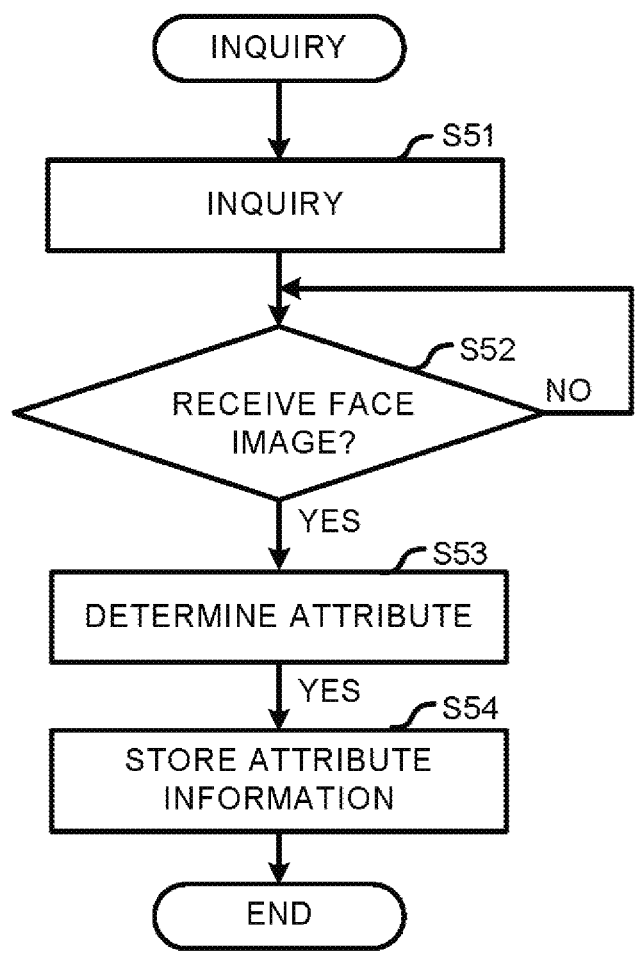
FIG. 10 is a flowchart illustrating the flow of a control processing carried out by the POS terminal.

FIG. 8-FIG. 10 are flowcharts illustrating the flows of a control processing carried out by the POS terminal 1. In FIG. 8, the control section 100 determines whether or not a code symbol attached to a commodity is read by the reading section 20 to input the commodity code (ACT S11). If it is determined that the commodity code is input (ACT S11: Yes), the control section 100 further determines whether or not the commodity code input in ACT S11 is a commodity code of the first or initial commodity in the transaction (ACT S12). The control section 100 determines that the commodity code is an initial input in the transaction if the commodity information of the commodity is not stored in the commodity information section 131.

If it is determined that the commodity code input in ACT S11 is an initial input in the transaction (ACT S12: Yes), the control section 100 activates a face detection thread (program) shown in FIG. 9 (ACT S13). Then, the control section 100 (commodity information storage module 101) executes a sales registration processing of the commodity the commodity code of which is input in ACT S11 (ACT S14). On the other hand, if it is determined that the commodity code input in ACT S11 is not an initial input in the transaction (ACT S12: No), since the face detection thread is activated already, the control section 100 carries out the processing in ACT S14 but not the processing in ACT S13. Then, the control section 100 returns to the processing in ACT S11.

The flow of a control processing of the face detection thread activated by the control section 100 in ACT S13 is described with reference to FIG. 9. The face detection thread is a program for capturing images of a customer H who is standing in front of the display section 19 for customer to carry out a transaction with the use of the camera C5 arranged on the POS terminal 1 and detecting a face from the captured images.

In FIG. 9, the control section 100 activates the camera C5 to start the capturing of images with the camera C5 (ACT S41). Then, the control section 100 determines, with the use of the foregoing face detection technology, whether or not a face is detected from the images captured by the camera C5 from the customer who is performing the transaction (ACT S42). If it is determined that the face is detected (ACT S42: Yes), the control section 100 stores the face image obtained in the face detection process in the image storage section 132 (ACT S43).

The control section 100 determines whether or not a face detection thread end signal is output by the control section 100 (ACT S44) described later. If it is determined that the face detection thread end signal is output by the control section 100 (ACT S44: Yes), the control section 100 stops the camera C5 to end the photography by the camera C5 (ACT S45).

Further, if it is determined in ACT S42 that no face is detected from the images captured by the camera C5 (ACT S42: No), the control section 100 carries out the processing in ACT S44 but not that in ACT S43. Further, if it is determined in ACT S44 that the face detection thread end signal is not output by the control section 100 (ACT S44: No), the control section 100 returns to the processing in ACT S42.

Return to FIG. 8, on the other hand, if it is determined in ACT S11 that no commodity code is input (ACT S11: No), the control section 100 declares the end of the transaction and determines whether or not the 'deposit/cash total' key 171 for declaring the settlement processing in which the transaction is settled with cash is operated (ACT S21). If it is determined that the 'deposit/cash total' key 171 is operated (ACT S21: Yes), the control section 100 outputs an end signal for ending the face detection thread activated in ACT S13 (S22). Then, the control section 100 carries out the settlement processing executing that the deposit money received from a customer is processed and that change is dispensed (ACT S23).

Next, the control section 100 determines whether or not a face image is stored in the image storage section 132 (ACT S24). If it is determined that a face image is stored in the image storage section 132 (ACT S24: Yes), then the control section 100 determines the attribute (e.g. gender and age bracket) of the customer according to the face image stored in the image storage section 132 (ACT S25). The control section 100 compares each face part (e.g. eyes, nose, mouth, ears and jaw) contained in the face image of the customer stored in image storage section 132 with the face parts information stored in the face parts information sections 1421 of the face master file 142. Then, the control section 100 determines the attribute of the customer according to the result of the comparison. Specifically, the control section 100 determines the attribute having the majority in similar face parts information within the face parts information of the face image stored in the image storage section 132. For example, if the eye information, the nose information, the mouth information and the ear information included in the face parts information of the face image stored in the image storage section 132 are similar to those of men in their forties, then even if the jaw information included in the face parts information of the face image stored in the image storage section 132 is similar to that of men in the other age brackets, the control section 100 still determines that the attribute of the customer is a man in his forties.

Next, the control section 100 (first attribute storage module 102) stores attribute information corresponding to the attribute determined in ACT S25 in the attribute totalization section 143 in association with the commodity information of the commodity purchased by the customer (ACT S26). Then, the control section 100 clears the information in the commodity information section 131 and the image storage section 132 (ACT S27).

On the other hand, if it is determined that no face image is stored in the image storage section 132 (ACT S24: No), the control section 100 determines whether or not the number of sales-registered commodities stored in the commodity information section 131 is more than three (ACT S31). If it is determined that there are more than three sales-registered commodities in the commodity information section 131 (ACT S31: Yes), the control section 100 activates a face inquiry thread shown in FIG. 10 (ACT S32) and outputs an inquiry signal containing the commodity information (including a commodity code) stored in the commodity information section 131 and an inquiry number to the camera server 4.

Next, the control section 100 totalizes information 'unknown' indicating an unknown attribute and stores them in the attribute totalization section 143 in association with the commodity information of the commodity purchased by the customer (ACT S33). Then, the control section 100 carries out the processing in ACT S27.

The flow of a control processing of the face inquiry thread activated by the control section 100 in ACT S32 is described with reference to FIG. 10. The face inquiry thread is a program for inquiring of the camera server 4 about a face image according to the commodity information of the commodity purchased by the customer and determining the attribute of the customer according to the face image received from the camera server 4.

The control section 100 (sending module 103) sends an inquiry signal to the camera server 4 according to the commodity information and inquiry number acquired in ACT S32 (ACT S51). Then, the control section 100 determines whether or not a face image is received for the inquiry (ACT S52). If it is determined that a face image is received (ACT S52: Yes), the control section 100 which waits for the reception of a face image (ACT S52: No) determines the attribute (e.g. gender and age bracket) of the customer according to the received face image (ACT S53). Next, the control section 100 (second attribute storage module 104) stores the attribute information of the determined attribute in the attribute totalization section 143 in association with the commodity information of the commodity purchased by the customer (ACT S54). Then, the control section 100 ends the processing.

Return to FIG. 8, if it is determined in ACT S21 that the 'deposit/cash total' key 171 is not operated (ACT S21: No), the control section 100 determines whether or not the attribute information of the attribute determined according to the face image received from the camera server 4 is acquired by the inquiry thread (ACT S36). If it is determined that the attribute information of the attribute determined according to the face image received from the camera server 4 is acquired (ACT S36: Yes), the control section 100 rewrites the information 'unknown' stored in the attribute totalization section 143 in ACT S33 with the acquired attribute information (ACT S37), that is, stores the attribute of the commodity the attribute of which is previously unknown. Then, the control section 100 returns to the processing in ACT S11. Further, if it is determined that the attribute information of the attribute determined according to the face image received from the camera server 4 is not acquired (ACT S36: No), the control section 100 returns to the processing in ACT S11.

Figure 11:
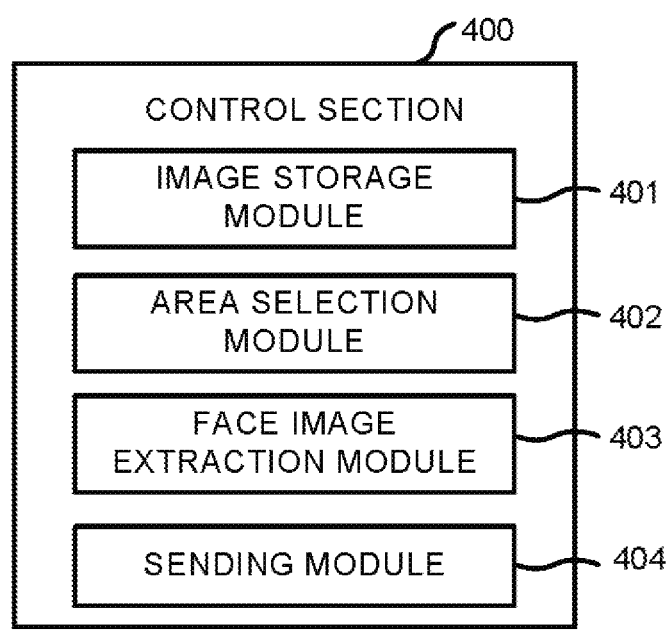
FIG. 11 is a functional block diagram illustrating the functional structure of the camera server.

Next, a control processing carried out by the camera server 4 is described with reference to FIG. 11-FIG. 13. FIG. 11 is a functional block diagram illustrating the functional structure of the camera server 4. The control section 400 realizes functions of an image storage module 401, an area selection module 402, a face image extraction module 403 and a sending module 404 according to various programs including the control program 441 stored in the ROM 42 and the memory section 44.

The image storage module 401 has a function of storing image information obtained by the cameras C installed in a plurality of commodity display areas by photographing customers who pass through the areas.

The area selection module 402 has a function of selecting each area stored in the storage section in which the commodity information received from the POS terminal 1 is stored.

The face image extraction module 403 has a function of identifying a face image of a customer who passes through the selected area according to the image information captured in the selected areas and extracting the face image information of the customer photographed in the majority of areas.

The sending module 404 has a function of sending the extracted face image information to the POS terminal 1.

Figure 12:
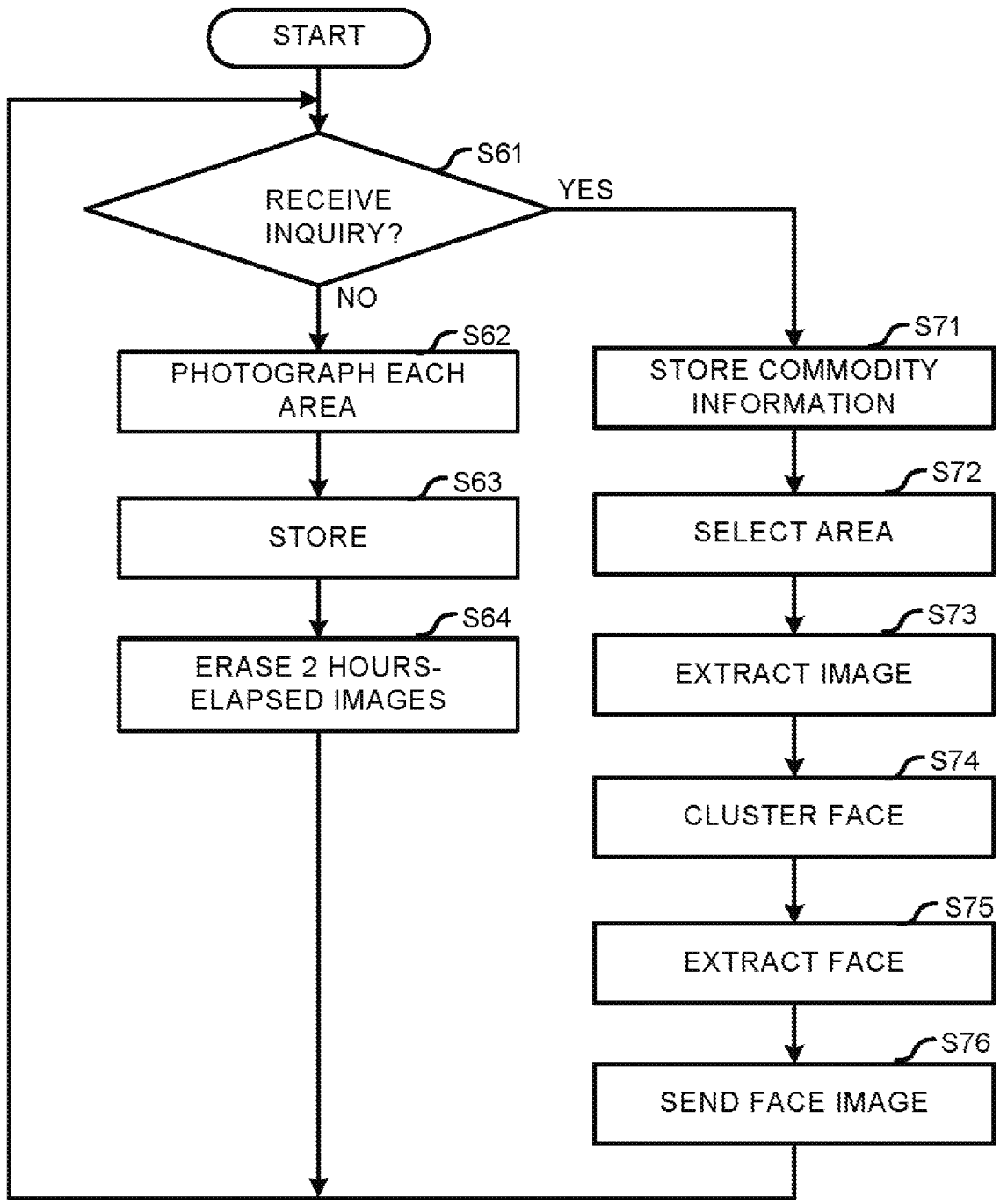
FIG. 12 is a flowchart illustrating the flow of a control processing carried out by the camera server.
Figure 13:
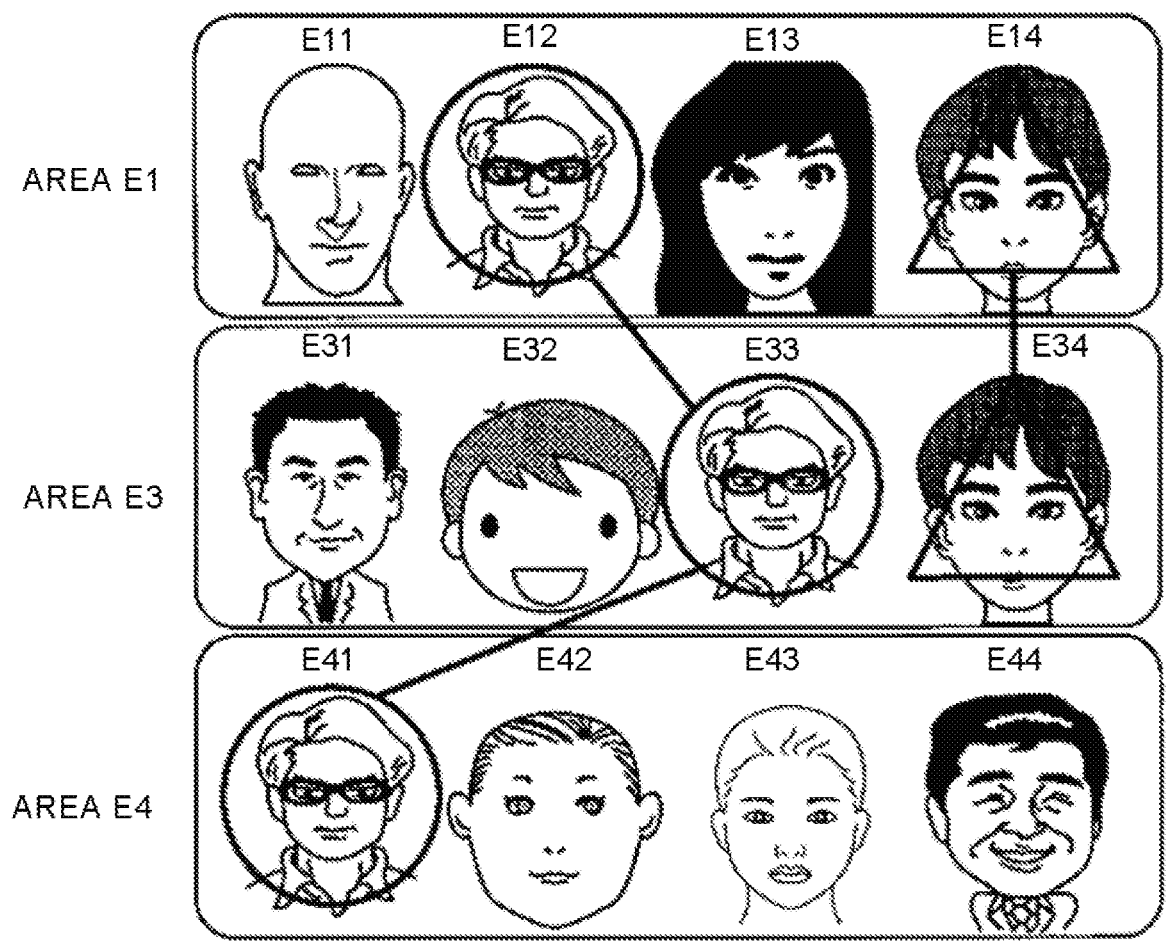
FIG. 13 is a schematic diagram exemplifying a face clustering of the camera server.

FIG. 12 is a flowchart illustrating the flow of the control processing carried out by the camera server 4. In FIG. 12, the control section 400 determines whether or not an inquiry signal is sent from the POS terminal 1 on the execution of the processing in ACT S51 (ACT S61). If it is determined that no inquiry signal is sent (ACT S61: No), the control section 400 activates the cameras C1-C4 to capture images of the customers who pass through the areas E (ACT S62). Then, the control section 400 (image storage module 401) stores the captured images in the area image section 442 (ACT S63). Next, the control section 400 erases the previous images captured more than two hours before from the current time within the images stored in the area image section 442 (ACT S64). The control section 400 returns to the processing in ACT S61.

On the other hand, if it is determined that an inquiry signal is sent from the POS terminal 1 (ACT S61: Yes), the control section 400 stores the commodity information and inquiry number received together with the inquiry signal in the RAM 43 (ACT S71).

The control section 400 selects an area E through which the customer H may pass according to the stored commodity information. The control section 400 specifies a commodity according to the commodity information stored in the RAM 43. The control section 400 (area selection module 402) selects an area E where the shelf S on which the specified commodity is displayed is arranged (ACT S72). For example, it is assumed that a commodity A, a commodity B and a commodity C are included in the commodity information. In this case, the customer purchases the commodities A, B and C. Thus, the customer passes at least through an area E1 where the shelf S1 on which the commodity A is displayed is arranged, an area E3 where the shelf S3 on which the commodity B is displayed is arranged and an area E4 where the shelf S5 on which the commodity C is displayed is arranged. Thus, the control section 400 selects the areas E1, E3 and E4.

Next, the control section 400 extracts, from the area image section 442b, the images captured by the cameras C which photograph the selected areas E (ACT S73). The control section 400 extracts, from the area E1 image section 442b1, the images captured by the camera C1 which photographs the selected area E1. Further, the control section 400 extracts the images captured by the camera C3 which photographs the selected area E3 from the area E3 image section 442b3 and those captured by the camera C4 which photographs the selected area E4 from the area E4 image section 442b4.

Then, the control section 400 recognizes each human face by carrying out a face recognition processing for the face images contained in the extracted images and associates (clusters) the face images of the same person with one another photographed in the areas E1, E3 and E4 (ACT S74). The face recognition processing refers to a processing of recognizing a human face from captured images with the use of a well-known face recognition technology. The control section 400 carries out the face recognition processing for all faces shown in the images extracted in areas E1, E3 and E4. The control section 400 clusters the face images shown in the images of the areas E1, E3 and E4 according to the face images on which the face recognition is performed.

The clustering of the face images is described with reference to FIG. 13. In FIG. 13, the face images (E11, E12, E13 and E14) of four customers are shown in the area E1. The face images (E31, E32, E33 and E34) of four customers are shown in the area E3. The face images (E41, E42, E43 and E44) of four customers are shown in the area E4. As the face image E12 in the area E1, the face image E33 in the area E3 and the face image E41 in the area E4 are recognized to be the same (common) face image according to the result of the face recognition processing on each face image, the face images E12, E33 and E41 are clustered. Further, the face image E14 in the area E1 and the face image E34 in the area E3 are recognized to be the same (common) face image, thus, the face images E14 and E34 are clustered.

Then, according to the result of the clustering, the control section 400 (face image extraction module 403) extracts the face image captured as the face image of the same person in the majority of areas within the areas E1, E3 and E4. In the embodiment, the face image common to the face images E12, E33 and E41 is extracted. Then, the control section 400 (sending module 404) sends the face image information of the extracted face image to the POS terminal 1 specified with the received inquiry number (ACT S76). The control section 400 returns to the processing in ACT S61. The POS terminal 1 determines an attribute according to the received face image information. Further, if there is a plurality of face images captured as the face image of the same person in the majority of areas in ACT S75, the control section 400 extracts a face image from the plurality of face images.

In the embodiment, if the face of a customer cannot be detected, the control section 100 of the POS terminal 1 stores information 'unknown' indicating an unknown attribute. The control section 100 sends the commodity information of a commodity purchased by the customer and an inquiry number to the camera server 4 to inquire of the camera server 4 about a face image. Further, the control section 100 receives the face image information of a customer extracted by the camera server 4. Then, the control section 100 determines the attribute of the customer according to the received face image information. Then, the control section 100 replaces the information 'unknown' with attribute information indicating the determined attribute and stores the attribute information. In this way, the POS terminal 1 can acquire the attribute information of the customer according to the face image information received from the camera server 4 even if the attribute information of the customer cannot be acquired because of failure of detection of the face of the customer. Thus, the POS terminal 1 can reduce the influence caused by the failure in the execution of a face detection processing.

Further, the control section 100 of the POS terminal 1 makes the foregoing inquiry if more than three commodities are purchased. This is because that if more than three commodities are purchased, the attribute of the customer who purchases more than three commodities at a time is narrowed and thus attribute information with high-precision can be acquired. Contrarily, no inquiry is made if less than three commodities are purchased. This is because that the purchasing of less than three commodities makes it hard to acquire attribute information with high-precision and such attribute information has a little effect on a statistical work based on the attribute information.

On the other hand, the control section 400 of the camera server 4 selects an area E according to the commodity information received from the POS terminal 1, clusters the face images of the persons shown in the area image of selected each area E and extracts the face image captured in the majority of areas. The face image is highly likely to be that of the customer who purchases the commodity the commodity information is received. Then, the control section 400 sends the face image information of the extracted face image to the POS terminal 1. The POS terminal 1 determines the attribute of the customer according to the received face image information and stores the attribute information. In this way, the control section 400 of the camera server 4 extracts the face image of a customer according to the commodity information received from the POS terminal 1 and sends the extracted face image to the POS terminal 1. Thus, the camera server 4 can reduce the influence with the failure in the acquisition of attribute information occurring because of no face detected in the POS terminal 1.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment, the POS terminal 1 inquires a face image if there are more than three sales-registered commodities; however, a face image may be inquired regardless of the number of the commodities.

Further, the cameras C1-C4 are arranged on the ceiling of the store P in the embodiment, and the camera C5 is arranged on the display section 19 for customer of the POS terminal 1. However, the cameras C1-C4 may be located at any other positions as long as the installed cameras C1-C4 can photograph the faces of the customers who pass through the areas E from the front sides of the customers. Furthermore, the camera C5 may be located at any other position as long as the installed camera C5 can photograph the front of the face of a customer who sees the display section 19 for customer.

Programs executed by the sales data processing apparatus in the foregoing embodiment may be recorded in a computer-readable recording medium such as a CD-ROM, a FD (Flexible Disk), a CD-R, and a DVD (Digital Versatile Disk) in the form of installable or executable file to be provided.

Further, the programs executed by the sales data processing apparatus of the foregoing embodiment may be stored in a computer connected with a network such as an Internet and downloaded via the network to be provided. Alternatively, the programs executed by the sales data processing apparatus of the foregoing embodiment may be provided or distributed via the network such as the Internet.

Alternatively, the programs executed by the sales data processing apparatus of the foregoing embodiment may be incorporated into the ROM to be provided.

What is claimed is:

1. A sales data processing apparatus, comprising:
    a hardware processor configured to:
        store commodity information identifying one or more commodities to which a transaction processing is executed in a storage section;
        in response to detecting, from a first image captured by a first camera arranged on the sales data processing apparatus, a face from which an attribute of a customer who purchases the one or more commodities can be determined, store attribute information indicating the attribute determined according to face image information extracted from the first image in the storage section in association with the commodity information;
        in response to determining that the attribute cannot be determined from the first image and that a number of the one or more commodities is equal to or greater than three:
            send the commodity information to a camera server that stores second images of multiple different areas of a store captured by respective multiple second cameras;
            extract the attribute information from a facial image received from the camera server, wherein the facial image is extracted by the camera server from a subset of the second images of a subset of the areas corresponding to the one or more commodities identified by the commodity information; and
            store the attribute information indicating the attribute in the storage section in association with the commodity information; and
        in response to determining that the number of the one or more commodities is less than three, record that the attribute of the customer is unknown.

2. The sales data processing apparatus according to claim 1, wherein
    wherein the attribute is at least one of a gender or an age bracket of the customer.

3. A method for acquiring attribute information, the method comprising:
    storing, by a sales data processing apparatus comprising a processor, commodity information identifying one or more commodities to which a transaction processing is executed in a storage section;
    in response to detecting, from a first image captured by a first camera built into the sales data processing apparatus, a face from which an attribute of a customer who purchases the one or more commodities can be determined, storing, by the sales data processing apparatus, attribute information indicating the attribute determined according to face image information extracted from the first image in the storage section in association with the commodity information;
    in response to determining that the attribute cannot be determined from the first image and that a number of the one or more commodities is equal to or greater than three:
        sending, by the sales data processing apparatus, the commodity information to a camera server that stores second images of multiple different areas of a store recorded by respective multiple second cameras;
        extracting, by the sales data processing apparatus, the attribute information from a facial image received from the camera server, wherein the facial image is extracted by the camera server from a subset of the second images of a subset of the areas corresponding to the one or more commodities identified by the commodity information; and
        storing, by the sales data processing apparatus, the attribute information indicating the attribute in the storage section in association with the commodity information; and
    in response to determining that the number of the one or more commodities is less than three, recording that the attribute of the customer is unknown.

* * * * *